United States Patent
Yoon et al.

(10) Patent No.: US 12,244,038 B2
(45) Date of Patent: Mar. 4, 2025

(54) ELECTRODE ASSEMBLY

(71) Applicant: LG Energy Solution, Ltd., Seoul (KR)

(72) Inventors: Se Hyun Yoon, Daejeon (KR); Beomsu Kim, Daejeon (KR); Yong Nam Kim, Daejeon (KR); Heeyong Kim, Daejeon (KR); Dong Hyeuk Park, Daejeon (KR); Dong Myung Kim, Daejeon (KR); Jae Han Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/860,645

(22) Filed: Jul. 8, 2022

(65) Prior Publication Data
US 2023/0013024 A1 Jan. 19, 2023

(30) Foreign Application Priority Data

Jul. 9, 2021 (KR) .................. 10-2021-0090588
Jul. 9, 2021 (KR) .................. 10-2021-0090589
(Continued)

(51) Int. Cl.
*H01M 50/46* (2021.01)
*H01M 4/04* (2006.01)
(Continued)

(52) U.S. Cl.
CPC ........... *H01M 50/46* (2021.01); *H01M 4/043* (2013.01); *H01M 4/0471* (2013.01);
(Continued)

(58) Field of Classification Search
CPC . H01M 50/46; H01M 50/466; H01M 10/0459
(Continued)

(56) References Cited

U.S. PATENT DOCUMENTS 9,209,491 B2   12/2015   Kim et al.
9,793,535 B2   10/2017   Yu et al.
(Continued)

FOREIGN PATENT DOCUMENTS

CN   002763997 Y   3/2006
CN   210403945 U   4/2020
(Continued)

OTHER PUBLICATIONS

International Search Report for Application No. PCT/KR2022/010010 mailed Oct. 28, 2022, pp. 1-3.
(Continued)

*Primary Examiner* — James M Erwin
(74) *Attorney, Agent, or Firm* — Lerner David LLP

(57) ABSTRACT

An electrode assembly includes a plurality of electrodes arranged in a stack along a stacking axis with a respective separator portion of an elongated separator sheet positioned between and winding around each of the electrodes in the stack along a serpentine path. The plurality of electrodes include a top electrode positioned at a top of the stack along the stacking axis, and the plurality of electrodes include a bottom electrode positioned at a bottom of the stack. The separator portions in the stack include a top separator portion abutting the top electrode and a bottom separator portion abutting the bottom electrode. The bottom electrode may have a thickness along the stacking axis that is from 80% to 120% of a thickness of the top electrode along the stacking axis. Moreover, a maximum thickness of each of the electrodes in the stack may be less than 8.3 mm.

20 Claims, 4 Drawing Sheets

(30) Foreign Application Priority Data

| Jul. 9, 2021 | (KR) | 10-2021-0090590 |
|---|---|---|
| Jul. 9, 2021 | (KR) | 10-2021-0090591 |
| Jul. 9, 2021 | (KR) | 10-2021-0090592 |
| Jul. 9, 2021 | (KR) | 10-2021-0090596 |
| Jul. 9, 2021 | (KR) | 10-2021-0090597 |
| Jul. 9, 2021 | (KR) | 10-2021-0090598 |
| Jul. 9, 2021 | (KR) | 10-2021-0090600 |
| Jul. 9, 2021 | (KR) | 10-2021-0090601 |

(51) Int. Cl.
    *H01M 10/04*      (2006.01)
    *H01M 10/0525*      (2010.01)
    *H01M 10/0583*      (2010.01)
    *H01M 50/463*      (2021.01)
    *H01M 50/466*      (2021.01)

(52) U.S. Cl.
    CPC ... *H01M 10/0404* (2013.01); *H01M 10/0431* (2013.01); *H01M 10/045* (2013.01); *H01M 10/0459* (2013.01); *H01M 10/0468* (2013.01); *H01M 10/0525* (2013.01); *H01M 10/0583* (2013.01); *H01M 50/463* (2021.01); *H01M 50/466* (2021.01)

(58) Field of Classification Search
    USPC .................................................. 429/460
    See application file for complete search history.

(56) References Cited

U.S. PATENT DOCUMENTS

| 10,333,126 | B2 | 6/2019 | Joo et al. |
|---|---|---|---|
| 10,985,356 | B2 | 4/2021 | Joo et al. |
| 2005/0186479 | A1 | 8/2005 | Totsuka et al. |
| 2006/0019154 | A1 | 1/2006 | Imachi et al. |
| 2007/0202394 | A1 | 8/2007 | Viavattine |
| 2008/0280208 | A1 | 11/2008 | Naoi et al. |
| 2009/0029259 | A1 | 1/2009 | Okazaki et al. |
| 2009/0136844 | A1 | 5/2009 | Watanabe et al. |
| 2010/0167176 | A1 | 7/2010 | Kawai |
| 2011/0052964 | A1 | 3/2011 | Kim et al. |
| 2011/0104550 | A1 | 5/2011 | Ahn et al. |
| 2013/0306237 | A1 | 11/2013 | Nagasaka et al. |
| 2014/0050958 | A1 | 2/2014 | Kwon et al. |
| 2014/0205879 | A1 | 7/2014 | Jang et al. |
| 2015/0033527 | A1 | 2/2015 | Park et al. |
| 2015/0162638 | A1 | 6/2015 | Bernini et al. |
| 2015/0180082 | A1 | 6/2015 | Jung et al. |
| 2015/0188108 | A1 | 7/2015 | Miyazawa et al. |
| 2016/0006072 | A1 | 1/2016 | Cho et al. |
| 2016/0028064 | A1 | 1/2016 | Choi et al. |
| 2016/0036087 | A1 | 2/2016 | Na et al. |
| 2016/0380301 | A1 | 12/2016 | Kosaka et al. |
| 2017/0125794 | A1 | 5/2017 | Zhao et al. |
| 2018/0076424 | A1 | 3/2018 | Kato |
| 2018/0090787 | A1 | 3/2018 | Makino et al. |
| 2018/0102568 | A1 | 4/2018 | Otohata |
| 2018/0205109 | A1 | 7/2018 | Cho et al. |
| 2018/0233725 | A1* | 8/2018 | Yasuda ............... H01M 50/431 |
| 2018/0233752 | A1 | 8/2018 | Herrmann et al. |
| 2018/0248219 | A1 | 8/2018 | Kim et al. |
| 2018/0294509 | A1 | 10/2018 | Liu et al. |
| 2018/0342722 | A1 | 11/2018 | Zeng et al. |
| 2019/0044177 | A1 | 2/2019 | Lee et al. |
| 2019/0051924 | A1 | 2/2019 | Kim et al. |
| 2020/0127334 | A1 | 4/2020 | Pyo et al. |
| 2020/0185753 | A1 | 6/2020 | Kwon |
| 2020/0227787 | A1 | 7/2020 | Kang et al. |
| 2020/0227788 | A1 | 7/2020 | Chun et al. |
| 2020/0235434 | A1 | 7/2020 | Lee et al. |
| 2020/0335813 | A1 | 10/2020 | Oh et al. |
| 2021/0050616 | A1 | 2/2021 | Taguchi et al. |
| 2021/0351431 | A1 | 11/2021 | Hwang |
| 2022/0006161 | A1 | 1/2022 | Kim et al. |
| 2023/0036396 | A1* | 2/2023 | Hosokawa .......... H01M 50/449 |

FOREIGN PATENT DOCUMENTS

| EP | 2856552 | B1 | 5/2016 |
|---|---|---|---|
| EP | 3905417 | A1 | 11/2021 |
| EP | 3985778 | A1 | 4/2022 |
| EP | 4027421 | A1 | 7/2022 |
| JP | S45-005056 | Y1 | 3/1970 |
| JP | h02046663 | A | 2/1990 |
| JP | H08138722 | A | 5/1996 |
| JP | 2002-208442 | A | 7/2002 |
| JP | 2003-151615 | A | 5/2003 |
| JP | 2005243455 | A | 9/2005 |
| JP | 2006032246 | A | 2/2006 |
| JP | 2008-091192 | A | 4/2008 |
| JP | 2008282739 | A | 11/2008 |
| JP | 2009-218105 | A | 9/2009 |
| JP | 2009259719 | A | 11/2009 |
| JP | 2010199281 | A | 9/2010 |
| JP | 2012033275 | A | 2/2012 |
| JP | 2013-149477 | A | 8/2013 |
| JP | 2013-254629 | A | 12/2013 |
| JP | 2015-141791 | A | 8/2015 |
| JP | 2015531989 | A | 11/2015 |
| JP | 2015532766 | A | 11/2015 |
| JP | 2016103425 | A | 6/2016 |
| JP | 2017-016946 | A | 1/2017 |
| JP | 2018-018712 | A | 2/2018 |
| JP | 2018-41703 | A | 3/2018 |
| JP | 2018510472 | A | 4/2018 |
| JP | 2018-181843 | A | 11/2018 |
| JP | 2018-532240 | A | 11/2018 |
| JP | 2019153427 | A | 9/2019 |
| JP | 2019199028 | A | 11/2019 |
| JP | 2020145123 | A | 9/2020 |
| JP | 6844476 | B2 | 3/2021 |
| KR | 2008-0063523 | A | 7/2008 |
| KR | 20100091353 | A | 5/2010 |
| KR | 20110048132 | A | 5/2011 |
| KR | 101058786 | B1 | 8/2011 |
| KR | 101209010 | B1 | 12/2012 |
| KR | 20130132230 | A | 12/2013 |
| KR | 20140022718 | A | 1/2014 |
| KR | 20140022447 | A | 2/2014 |
| KR | 2014-0060797 | A | 5/2014 |
| KR | 2014-0064405 | A | 5/2014 |
| KR | 20140042761 | A | 5/2014 |
| KR | 20150016671 | A | 2/2015 |
| KR | 20150020667 | A | 2/2015 |
| KR | 2015-0022264 | A | 3/2015 |
| KR | 2015-0035079 | A | 4/2015 |
| KR | 20150034944 | A | 4/2015 |
| KR | 20150049892 | A | 5/2015 |
| KR | 20150050505 | A | 5/2015 |
| KR | 101531234 | B1 | 6/2015 |
| KR | 20150144183 | A | 12/2015 |
| KR | 101595621 | B1 | 2/2016 |
| KR | 20160054219 | A | 5/2016 |
| KR | 101643593 | B1 | 7/2016 |
| KR | 20160108116 | A | 9/2016 |
| KR | 101704759 | B1 | 2/2017 |
| KR | 101761720 | B1 | 7/2017 |
| KR | 101784033 | B1 | 10/2017 |
| KR | 20180006324 | A | 1/2018 |
| KR | 101826894 | B1 | 2/2018 |
| KR | 101838350 | B1 | 3/2018 |
| KR | 20180037847 | A | 4/2018 |
| KR | 20180061872 | A | 6/2018 |
| KR | 20180128770 | A | 12/2018 |
| KR | 101941144 | B1 | 1/2019 |
| KR | 101963313 | B1 | 3/2019 |
| KR | 20190054491 | A | 5/2019 |
| KR | 20190056812 | A | 5/2019 |
| KR | 20190064977 | A | 6/2019 |
| KR | 101995038 | B1 | 7/2019 |
| KR | 102044363 | B1 | 11/2019 |

(56) References Cited

FOREIGN PATENT DOCUMENTS

| | | | |
|---|---|---|---|
| KR | 20200023852 A | 3/2020 | |
| KR | 20200023853 A | 3/2020 | |
| KR | 20200023854 A | 3/2020 | |
| KR | 20200036641 A * | 4/2020 | ............. H01M 2/18 |
| KR | 20200061033 A | 6/2020 | |
| KR | 20200067575 A | 6/2020 | |
| KR | 20200069171 A | 6/2020 | |
| KR | 20200094325 A | 8/2020 | |
| KR | 20200095896 A | 8/2020 | |
| KR | 20200145375 A | 12/2020 | |
| KR | 20210033327 A | 3/2021 | |
| KR | 102253132 B1 | 5/2021 | |
| KR | 20210049297 A | 5/2021 | |
| KR | 20210051155 A | 5/2021 | |
| KR | 20210051164 A | 5/2021 | |
| KR | 102256438 B1 | 6/2021 | |
| KR | 102265741 B1 | 6/2021 | |
| KR | 20210135861 A | 11/2021 | |
| WO | 2006120959 A1 | 11/2006 | |
| WO | 2016-152922 A1 | 9/2016 | |
| WO | 2017018456 A1 | 2/2017 | |
| WO | 2018116295 A1 | 6/2018 | |
| WO | 2019188719 A1 | 10/2019 | |
| WO | 2021/131879 A1 | 7/2021 | |

OTHER PUBLICATIONS

International Search Report for Application No. PCT/KR2022/010006 mailed Nov. 4, 2022, pp. 1-3.
Written Opinion of the ISA for PCT/KR2022/010004 mailed Oct. 26, 2022. 4 pgs.
Written Opinion of the ISA for PCT/KR2022/010003 mailed Nov. 2, 2022. 3 pgs.
Written Opinion of the ISA for PCT/KR2022/010000 mailed Oct. 26, 2022. 4 pgs.
International Search Report for Application No. PCT/KR2022/010001 mailed Nov. 8, 2022, pp. 1-3.
International Search Report for Application No. PCT/KR2022/010005 mailed Nov. 8, 2022, pp. 1-3.
International Search Report for Application No. PCT/KR2022/010007 mailed Oct. 28, 2022, pp. 1-3.
International Search Report for Application No. PCT/KR2022/010008 mailed Nov. 4, 2022, pp. 1-3.
International Search Report for Application No. PCT/KR2022/010009 mailed Nov. 4, 2022, pp. 1-3.
Extended European Search Report including Written Opinion for Application No. 22838071.3 dated Jun. 24, 2024, pp. 1-8.
Extended European Search Report for Application No. 22838066.3 dated Aug. 5, 2024, pp. 1-5.

* cited by examiner

[FIG. 1]
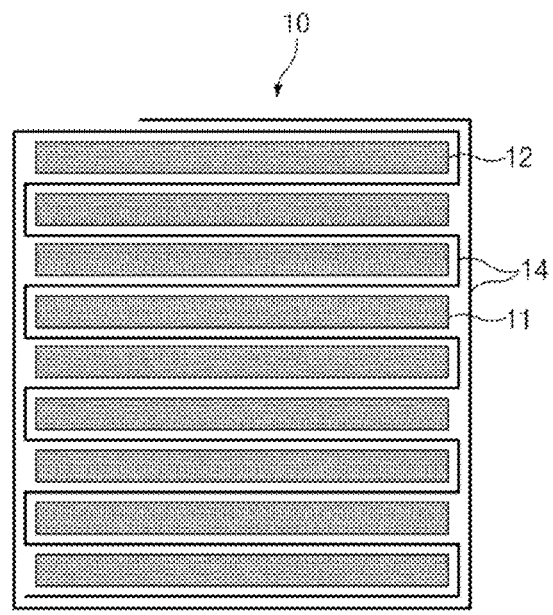
[FIG. 2]
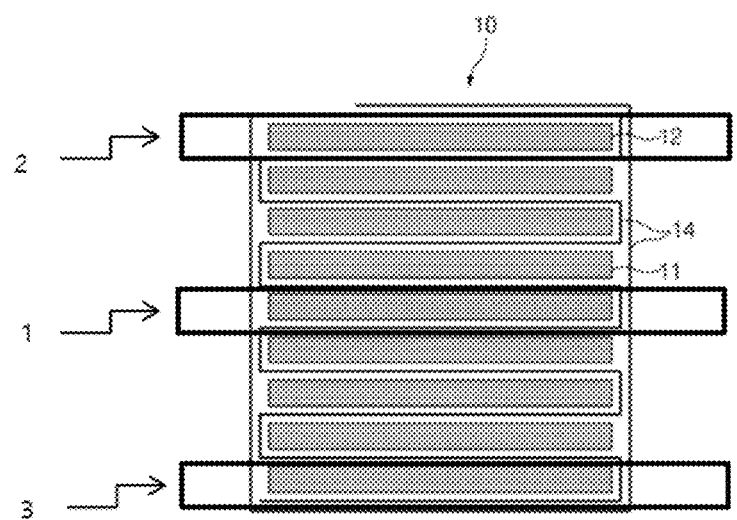

[FIG. 3]
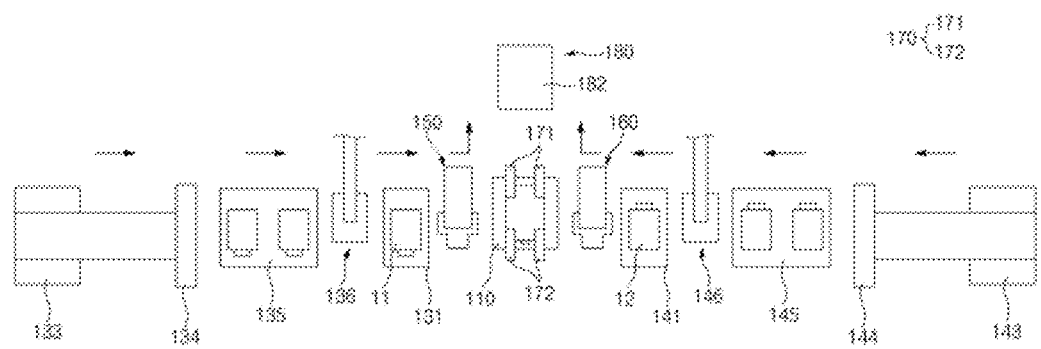
[FIG. 4]
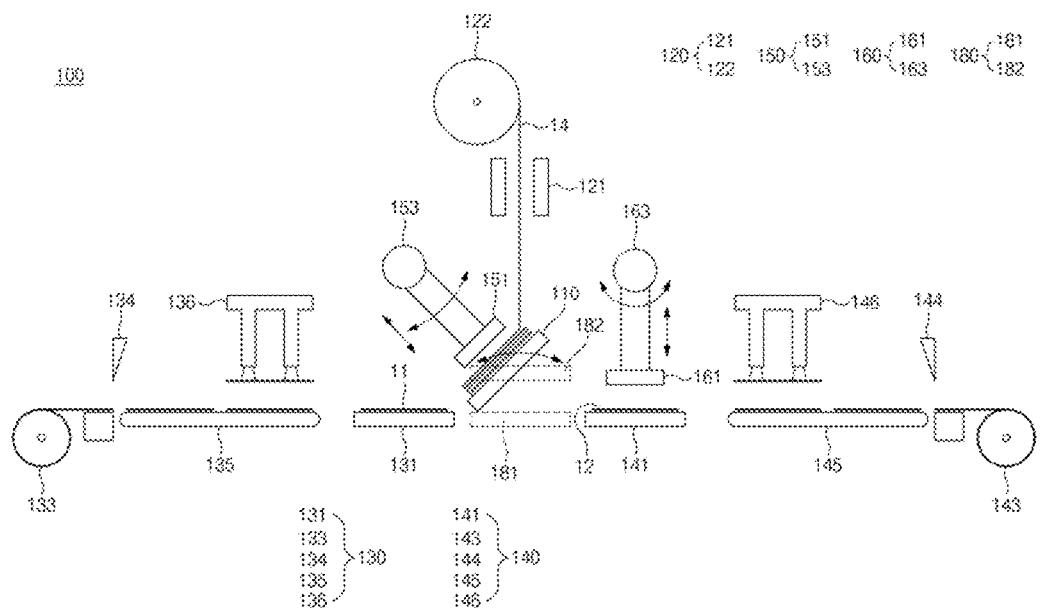

[FIG. 5]
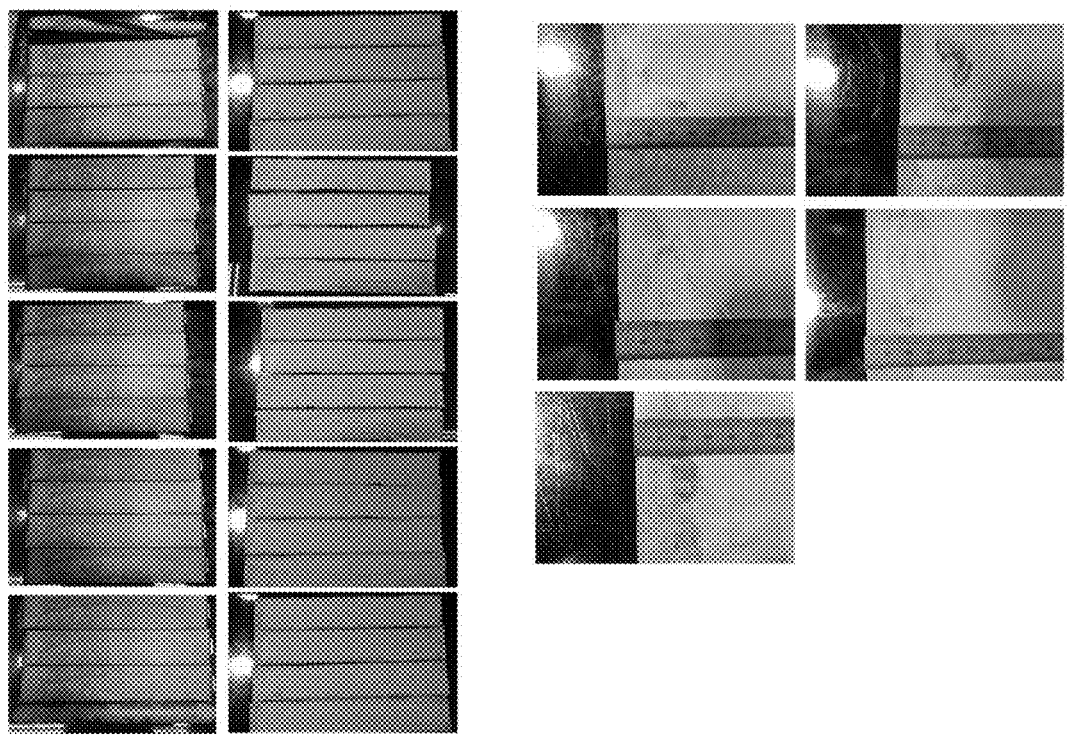
[FIG. 6]
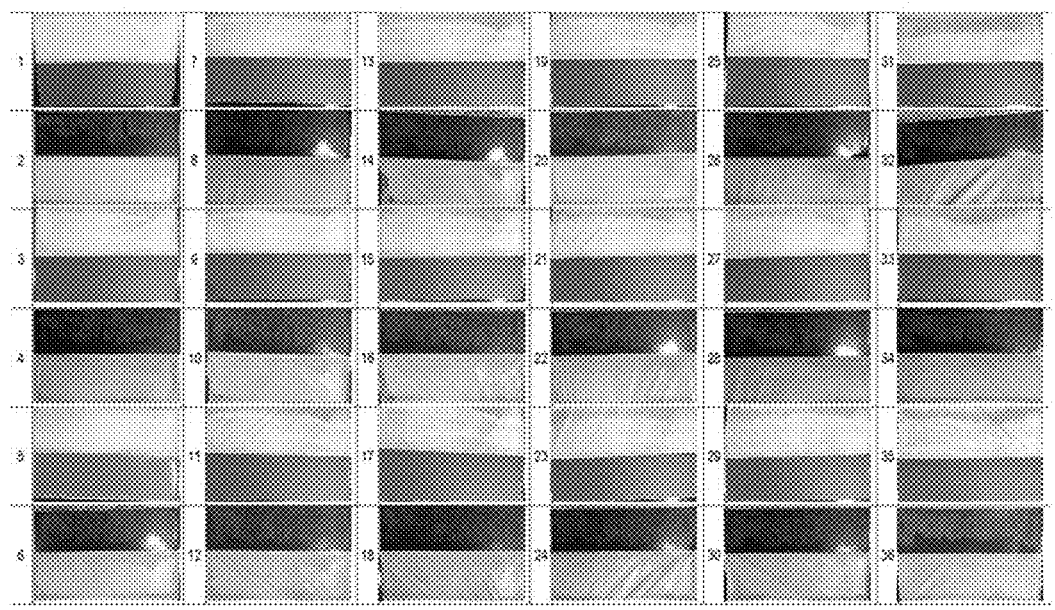

[FIG. 7]
[FIG. 8]
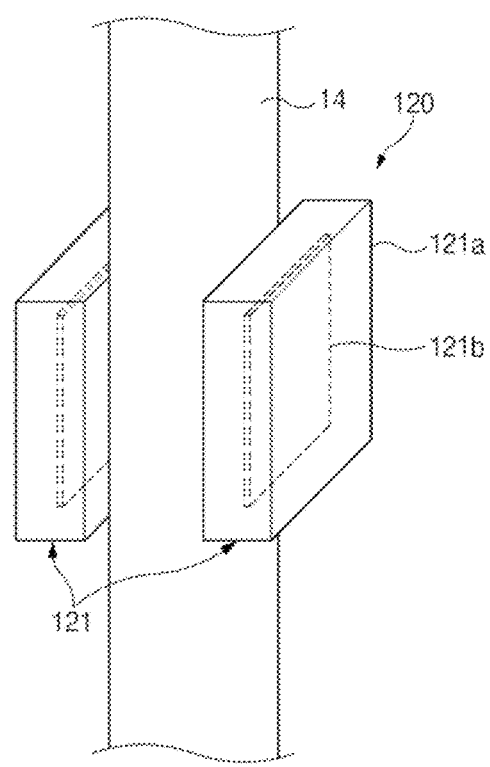

ELECTRODE ASSEMBLY

CROSS-REFERENCE TO RELATED APPLICATIONS

This application claims priority from Korean Patent Application No. 10-2021-0090598 filed on Jul. 9, 2021, Korean Patent Application No. 10-2021-0090588 filed on Jul. 9, 2021, Korean Patent Application No. 10-2021-0090589 filed on Jul. 9, 2021, Korean Patent Application No. 10-2021-0090590 filed on Jul. 9, 2021, Korean Patent Application No. 10-2021-0090591 filed on Jul. 9, 2021, Korean Patent Application No. 10-2021-0090592 filed on Jul. 9, 2021, Korean Patent Application No. 10-2021-0090596 filed on Jul. 9, 2021, Korean Patent Application No. 10-2021-0090597 filed on Jul. 9, 2021, Korean Patent Application No. 10-2021-0090600 filed on Jul. 9, 2021, and Korean Patent Application No. 10-2021-0090601 filed on Jul. 9, 2021, the entire contents of all of which are incorporated herein by reference.

FIELD OF THE INVENTION

The present invention relates to an electrode assembly.

BACKGROUND ART

Secondary batteries, unlike primary batteries, are rechargeable, and have been widely researched and developed in recent years due to their small size and large capacity. As technology development and demand for mobile devices increase, the demand for secondary batteries as an energy source is rapidly increasing.

Secondary batteries can be classified into a coin-type battery, a cylindrical battery, a prismatic battery, and a pouch-type battery, according to the shape of the battery case. In a secondary battery, an electrode assembly mounted inside a battery case is a chargeable/dischargeable power generating element having a stacked structure comprising electrodes and separators.

The electrode assembly may be generally classified into a jelly-roll type, a stack type, and a stack-and-folding type. In the jelly-roll type, a separator is interposed between a sheet type positive electrode and a sheet type negative electrode, each of which are coated with an active material, and the entire arrangement is wound. In the stack type, a plurality of positive and negative electrodes are sequentially stacked with a separator interposed therebetween. In a stack-and-folding type, stacked unit cells are wound with a long-length separation film.

SUMMARY OF THE INVENTION

The present invention provides, among other things, an electrode assembly which has reduced deviations in adhesive force and air permeability across each layer, while still maintaining adequate adhesive force and air permeability.

An exemplary aspect of the present invention provides an electrode assembly. The electrode assembly in accordance with such aspect of the invention preferably includes a plurality of electrodes arranged in a stack along a stacking axis with a respective separator portion positioned between each of the electrodes in the stack. The plurality of electrodes include a top electrode positioned at a top of the stack along the stacking axis, and the plurality of electrodes include a bottom electrode positioned at a bottom of the stack along the stacking axis. The bottom electrode may have a thickness along the stacking axis that is from 80% to 120% of a thickness of the top electrode along the stacking axis. Moreover, a maximum thickness of each of the electrodes in the stack may be less than 8.3 mm.

In accordance with some aspects of the invention, the separator portions may be portions of an elongated separator sheet. Such elongated separator sheet may be folded between each separator portion such that the elongated separator sheet follows a serpentine path traversing back and forth along an orthogonal dimension orthogonal to the stacking axis to extend between each of the successive electrodes in the stack.

The electrode assembly according to exemplary aspects of the present invention is desirably capable of preventing side-effects, such as lithium (Li) precipitation in the electrode assembly and non-charging of the electrode assembly. The electrode assembly according to the present invention is preferably also structurally stable and has high safety in use.

BRIEF DESCRIPTION OF THE DRAWINGS

FIG. 1 is a cross-sectional view illustrating an example of an electrode assembly according to an exemplary embodiment of the present invention.

FIG. 2 is a cross-sectional view of the electrode assembly of FIG. 1, illustrating positions of an upper surface, a lower surface, and a middle portion of the electrode assembly.

FIG. 3 is a top plan view illustrating an electrode assembly manufacturing apparatus for manufacturing the electrode assembly according to the present invention.

FIG. 4 is a front elevation view conceptually illustrating the electrode assembly manufacturing apparatus of FIG. 3.

FIGS. 5 and 6 are photographs showing the results of checking whether lithium (Li) is precipitated by disassembling the electrode assemblies of Comparative Example 1 and Example 1, respectively, after charging is completed.

FIG. 7 is a diagram schematically illustrating an electrode assembly manufacturing method for manufacturing the electrode assembly according to the present invention.

FIG. 8 is a perspective view of a separator heating unit of a separator supply unit according to the exemplary embodiment of the present invention.

DETAILED DESCRIPTION

The objects, specific advantages, and novel features of the present invention will become more apparent from the following detailed description taken in conjunction with the accompanying drawings and exemplary embodiments. In the present specification, in adding reference numbers to the constituent elements of each drawing, it should be noted that the same constituent elements are given the same number even though they are indicated on different drawings. In addition, the present invention may be implemented in several different forms and is not limited to the exemplary embodiments described herein. Further, in describing the present invention, detailed descriptions of related known technologies that may unnecessarily obscure the gist of the present invention will be omitted.

FIG. 1 is a cross-sectional view illustrating an example of an electrode assembly according to an exemplary embodiment of the present invention. That is, referring to FIG. 1, an electrode assembly 10 according to an exemplary embodiment of the present invention includes a stack of electrodes in which one or more first electrodes 11 alternates with one or more second electrodes 12. Each of the electrodes in the stack are separated from one another by a separator 14 positioned therebetween, which may be a single elongated separator 14 repeatedly folded so as to follow a serpentine or zigzag path around each successive electrode.

The electrode assembly 10 is a chargeable/dischargeable power generating element, where the first electrode may be a positive electrode, and the second electrode may be a negative electrode. However, alternatively, the first electrode may be a negative electrode, and the second electrode may be a positive electrode. Moreover, the electrode assembly 10 may be provided in a form in which the outermost portion is surrounded by the separator 14, e.g., by wrapping the separator around the assembled electrode assembly 10, as illustrated in FIG. 1. With respect to the electrodes and the separator comprising the electrode assembly, materials commonly used in the art may be used.

As discussed further herein, an "upper surface" of the electrode assembly 10 refers to the uppermost position of the electrode assembly 10 in the stacking direction of the electrode assembly, which is designated by reference numeral 2 in FIG. 2. Thus, subsequent references to "upper surface air permeability" relate to air permeability of the separator 14 abutting the uppermost electrode in the electrode assembly. Likewise, subsequent references to "upper surface adhesive force" refer the adhesive force between the uppermost electrode in the electrode assembly and the abutting portion of the separator 14.

Further, as discussed herein, a "lower surface" of the electrode assembly 10 refers to the lowermost position of the electrode assembly 10 in the stacking direction of the electrode assembly, which is designated by reference numeral 3 in FIG. 2. Thus, subsequent references to "lower surface air permeability" relate to air permeability of the separator 14 abutting the lowermost electrode in the electrode assembly. Likewise, subsequent references to "lower surface adhesive force" refer the adhesive force between the lowermost electrode in the electrode assembly and the abutting portion of the separator 14.

Finally, as discussed herein, the "middle" of the electrode assembly 10 refers to a middle position between the upper surface and the lower surface of the electrode assembly 10 in the stacking direction of the electrode assembly, as designated by reference numeral 1 in FIG. 2. For example, when an electrode assembly 10 formed of nine electrodes and viewed from the side, as in FIG. 2, the "middle" position relates to the position of the fifth electrode in the stack. Thus, subsequent references to "middle air permeability" relate to air permeability of the separator 14 abutting the middle electrode in the electrode assembly. Likewise, subsequent references to "middle adhesive force" refer the adhesive force between the middle electrode in the electrode assembly and the abutting portion of the separator 14.

Referring to FIGS. 3 and 4, an apparatus 100 for manufacturing an electrode assembly according to an exemplary embodiment of the present invention includes a stack table 110; a separator supply unit 120 for supplying a separator 14; a first electrode supply unit 130 for supplying a first electrode 11; a second electrode supply unit 140 for supplying a second electrode 12; a first electrode stack unit 150 for stacking the first electrode 11 on the stack table 110; a second electrode stack unit 160 for stacking the second electrode 12 on the stack table 110; and a press unit 180 for bonding the first electrode 11, the separator 14, and the second electrode 12 to each other. Further, the apparatus 100 for manufacturing the electrode assembly according to the exemplary embodiment of the present invention may include a holding mechanism 170 for fixing the stack (comprising the first electrode(s) 11, the second electrode(s) 12, and the separator 14) to the stack table 110 as the stack is being assembled.

The separator supply unit 120 may have a passage through which the separator 14 passes towards the stack table 110. In particular, the separator supply unit 120 may include a separator heating unit 121 defining the passage through which the separator 14 passes towards the stack table 110. As shown in FIG. 8, the separator heating unit 121 may include a pair of bodies 121a, each of which may be in the form of a square block, and the bodies 121a may be spaced apart by a distance defining one of the dimensions of the passage through which the separator 14 passes. At least one or both of the bodies 121a may further include a separator heater 121b for heating the respective body 121a, and thereby transferring heat to the separator 14.

The separator supply unit 120 may further include a separator roll 122 on which the separator 14 is wound. Thus, the separator 14 wound on the separator roll 122 may be gradually unwound and pass through the formed passage to be supplied to the stack table 110.

The first electrode supply unit 130 may include a first electrode roll 133 on which the first electrode 11 is wound in the form of a sheet, a first cutter 134 for cutting the first electrode 11 at regular intervals to form the first electrodes 11 having a predetermined size when the first electrode 11 is unwound and supplied from the first electrode roll 133, a first conveyor belt 135 for moving the first electrode 11 cut by the first cutter 134, and a first electrode supply head 136 for picking up (e.g., via vacuum suction) the first electrode 11 transferred by the first conveyor belt 135 and seating the first electrode 11 on a first electrode seating table 131.

The second electrode supply unit 140 may include a second electrode seating table 141 on which the second electrode 12 is seated before being stacked on the stack table 110 by the second electrode stack unit 160. The second electrode supply unit 140 may further include a second electrode roll 143 on which the second electrode 12 is wound in the form of a sheet, a second cutter 144 for cutting the second electrode 12 at regular intervals to form the second electrode 12 of a predetermined size when the second electrode 12 is unwound and supplied from the second electrode roll 143, a second conveyor belt 145 for moving the second electrode 121 cut by the second cutter 144, and a second electrode supply head 146 for picking up (e.g., via vacuum suction) the second electrode 12 transferred by the second conveyor belt 145 and seating the second electrode on the second electrode seating table 141.

The first electrode stack unit 150 may be structured to stack the first electrode 11 on the stack table 110. The first electrode stack unit 150 may include a first suction head 151 and a first moving unit 153. The first suction head 151 may pick up the first electrode 11 seated on the first electrode seating table 131 via vacuum suction through one or more vacuum suction ports (not shown) formed on a bottom surface of the first suction head 150, and then the first moving unit 153 may move the first suction head 151 to the stack table 110 so as to allow the first suction head 151 to stack the first electrode 11 on the stack table 110.

The second electrode stack unit 160 may also be structured to stack the second electrode 12 on the stack table 110. The second electrode stack unit 160 may have the same structure as that of the foregoing first electrode stack unit 150. In such case, the second electrode stack unit 160 may include a second suction head 161 and a second moving unit 163. The second suction head 161 may pick up the second electrode 12 seated on the second electrode seating table 141 via vacuum suction. The second moving unit 163 may then move the second suction head 161 to the stack table 110 so as to allow the second suction head 161 to stack the second electrode 12 on the stack table 110.

The stack table 110 may be rotatable so as to rotate between positions facing the first electrode stack unit 150 and the second electrode stack unit 160. As the stack table 110 rotates, the holding mechanism 170 may hold the stack being assembled (comprising the first electrode 11, the second electrode 12, and the separator 14) in order to secure the position of the stack relative to the stack table 110. For example, the holding mechanism 170 may apply downward pressure to the upper surface of the stack to press it towards the stack table 110. The holding mechanism 170 may include, for example, a first holder 171 and a second holder 172 to fix opposing sides of the first electrode 11 or the second electrode 12. The holders 171, 172 may each be in the form of one or more clamps or other clamping mechanisms.

Thus, in operation, the first electrode 11 is supplied from the first electrode supply unit 130 to the first electrode stack unit 150, the first electrode stack unit 150 stacks the first electrode 11 on the upper surface of the separator 14 stacked on the stack table 110. The holding mechanism 170 then presses down on the upper surface of the first electrode 11 to secure the position of the first electrode 11 on the stack table 110. Thereafter, the stack table 110 is rotated in the direction of the second electrode stack unit 160 while the separator 14 is continuously supplied so as to cover the upper surface of the first electrode 11. Meanwhile, the second electrode 12 is supplied from the second electrode supply unit 140 and is stacked by the second electrode stack unit 160 on a portion of the separator 14 where the separator 14 covers the upper surface of the first electrode 11. Then the holding mechanism 170 releases the upper surface of the first electrode 11 and then presses down on the upper surface of the second electrode 12 to secure the position of the stack S being built vis-a-vis the stack table 110.

Thereafter, by repeating the process of stacking the first electrode 11 and the second electrode 12, the stack S in which the separator 14 is zig-zag-folded and positioned between each of the successive first and second electrodes 11, 12 may be formed.

After the components of the electrode assembly are stacked, the electrode assembly may undergo one or more heat press operations. In particular, the electrode assembly may be moved to the press unit 180, which applies heat and pressure to the stack by advancing heated pressing blocks 181 and 182 towards one another with the stack positioned therebetween. As a result, the components of the stack (i.e., the electrodes and separator) are thermally bonded to one another, so as to desirably prevent the completed electrode assembly from falling apart or the components of the electrode assembly from shifting their positions within the stack.

The heat press operations applied to the electrode assembly may include a primary heat press operation and a secondary heat press operation. The primary heat press relates to an operation after the first electrode(s) and the second electrode(s) are alternately stacked between the folded separators to define a stack, where the stack is gripped with a gripper, and then the stack is heated and pressed. The secondary heat press operation relates to an operation after the primary heat press operation, in which the gripping of the stack by the gripper is ceased and the stack is once more heated and pressed.

Referring to FIG. 7, the method may first include a stack process of assembling a stack (stack cell) on a stack table by alternately stacking the first electrode and the second electrode on the separator, where the separator is continuously supplied and sequentially folded over a previously-stacked one of the first and second electrodes before a subsequent one of the first and second electrodes is stacked. After the stack process, the stack may be moved way from the stack table. During such time, the separator is pulled, and, after the separator is pulled for a predetermined length, the separator is cut. Thereafter, the predetermined length of he cut end of the separator is wound around the stack cell. The movement of the stack away from the stack table may be accomplished by the gripper, which is desirably a movable component that can grip the stack on the stack table and then move the stack to the press unit 180, where the heat press operations are performed. The primary heat press operation is then performed in a state in which the wound stack cell is gripped with the gripper. After the primary heat press operation is completed, the grip of the stack cell by the gripper is released. After the gripper is removed, the secondary heat press operation is performed. When the secondary heat press operation is completed, the finished electrode assembly may be complete.

When the temperature, pressure, and time conditions disclosed herein are not satisfied, the components of the electrode assembly may not be properly adhered together, which can result in the electrode assembly falling apart or the components of the electrode assembly shifting their positions within the assembly, particularly when the electrode assembly is moved before being inserted into a battery case. A problem may also occur in which the air permeability of the separator is excessively high.

On the other hand, when the heat press operations disclosed herein are performed (including satisfying the respective pressure, temperature, and time conditions), an electrode assembly may be manufactured without the need to individually heat and/or press each level of the electrode assembly (i.e., heating and/or pressing each electrode and separator pair at each step of the process) in order to bond the components together. Such individual heat pressing at each level can detrimentally cause the effects of the heat and/or pressure to accumulate in the lower separators in the stack, since the already-stacked layers will experience the heat and/or pressure of each application. That can negatively impact such portions of separator by, for example, reducing porosity (and air permeability). In contrast, the present invention allows the entire electrode assembly to be simultaneously bonded, which improves uniformity, among other things. It is thus possible to simultaneously achieve both an appropriate level of adhesive force between the electrodes and also achieve a separator having an appropriate amount of air permeability, all while minimizing damage to the unit electrode.

In the present application, the "air permeability" of the electrode assembly refers to the air permeability of the separator component of the electrode assembly. In addition, unless specifically stated, the "air permeability" means air permeability of all separators comprising the electrode assembly, where the air permeability of each separator may be independently the same or different.

In general, when the air permeability is less than 40 sec/100 ml, the speed of lithium ion movement in the separator is increased, but there can be a problem in that the safety of the electrode assembly may be rapidly reduced, and there can also be a problem in that the speed of the lithium ion movement in the electrode(s) in the electrode assembly may not correspond to the speed of the lithium ion movement in the separator. Further, when the air permeability is greater than 120 sec/100 ml, the speed of lithium ion movement in the separator is lowered, which may reduce efficiency and performance of charging and discharging cycles.

Thus, regardless of position within the electrode assembly, the separator desirably has an air permeability in a range from 40 sec/100 ml to 120 sec/100 ml.

The electrode assembly according to the present invention preferably has higher air permeability than electrode assemblies in the related art, thereby increasing the safety of the electrode assembly. Specifically, the upper surface air permeability and the lower surface air permeability of the electrode assembly according to the present invention may each independently be in a range from 80 sec/100 ml to 120 sec/100 ml.

In accordance with the present invention, the method for measuring the air permeability of the separator is not particularly limited, and the air permeability may be measured by using a method commonly used in the art. For example, a Gurley type Densometer (No. 158) manufactured by Toyoseiki may be used according to the JIS Gurley measurement method of the Japanese industrial standard. That is, the air permeability of the separator may be obtained by measuring the time it takes for 100 ml (or 100 cc) of air to pass through the separator of 1 square inch under a pressure of 0.05 MPa at room temperature (i.e., 20° C. to 25° C.).

According to exemplary embodiments of the present invention, the middle air permeability of the electrode assembly may be in a range from 70 sec/100 ml to 85 sec/100 ml, preferably from 75 sec/100 ml to 85 sec/100 ml.

According to exemplary embodiments of the present invention, the upper surface air permeability of the electrode assembly may be in a range from 80 sec/100 ml to 120 sec/100 ml, preferably from 80 sec/100 ml to 110 sec/110 ml, more preferably from 80 sec/100 ml to 100 sec/100 ml.

According to exemplary embodiments of the present invention, the lower surface air permeability of the electrode assembly may be in a range from 80 sec/100 ml to 120 sec/100 ml, preferably from 80 sec/100 ml to 110 sec/110 ml, more preferably from 80 sec/100 ml to 100 sec/100 ml.

According to exemplary embodiments of the present invention, the lower surface air permeability may be less than or equal to the upper surface air permeability. In addition, the middle air permeability may be less than or equal to the lower surface air permeability.

That is, the magnitude of the upper surface air permeability, the lower surface air permeability, and the middle air permeability may satisfy Equation 1 below.

Upper surface air permeability≥Lower surface air permeability≥Middle air permeability    [Equation 1]

The values of air permeability in Equation 1 relate to the air permeability of the separators in the electrode assembly after the completion of the heating and pressing steps.

According to exemplary embodiments of the present invention, the adhesive force between the separator and the electrodes at any of the positions in the electrode assembly (i.e., upper surface, middle, and lower surface) may be in a range from 5 gf/20 mm to 75 gf/20 mm.

In the present invention, a method for measuring adhesive force of the separator is not particularly limited. For example, samples of the lower portion, the middle portion, and the upper portion of the electrode assembly may be separated from the stack. Such samples may include a positive electrode and a separator or a negative electrode and a separator. The samples, which may have a width of 55 mm and a length of 20 mm, are each adhered to a respective slide glass with the electrode being positioned on the adhesive surface of the slide glass. The samples are then each tested by performing a 90° peel test at a speed of 100 mm/min pursuant to the testing method set forth in ASTM-D6862. That is, an edge of the separator is pulled upwardly at 90° relative to the slide glass at a speed of 100 mm/min so as to peel the separator away from the electrode along the width direction of the sample (i.e., peeling from 0 mm to 55 mm).

According to exemplary embodiments of the present invention, the middle adhesive force of the electrode assembly may be in a range from 5 gf/20 mm to 35 gf/20 mm, preferably from 5 gf/20 mm to 15 gf/20 mm.

According to exemplary embodiments of the present invention, the upper surface adhesive force of the electrode assembly may be in a range from 5 gf/20 mm to 75 gf/20 mm, preferably from 6 gf/20 mm to 30 gf/20 mm.

According to exemplary embodiments of the present invention, the lower surface adhesive force of the electrode assembly may be in a range from 5 gf/20 mm to 75 gf/20 mm, preferably from 9 gf/20 mm to 30 gf/20 mm.

According to exemplary embodiments of the present invention, the lower surface adhesive force and the upper surface adhesive force may be greater than the middle adhesive force.

According to exemplary embodiments of the present invention, the adhesive force between the positive electrode and the separator and the adhesive force between the negative electrode and the separator may be the same as or may be different from each other.

According to exemplary embodiments of the present invention, a deviation between the middle adhesive force of the electrode assembly and either the upper surface adhesive force or the lower surface adhesive force of the electrode assembly may be in a range from 10 gf/20 mm to 35 gf/20 mm, preferably from 10 gf/20 mm to 20 gf/20 mm.

According to exemplary embodiments of the present invention, a deviation between the middle air permeability of the electrode assembly and either the upper surface air permeability or the lower surface air permeability of the electrode assembly may be in a range from 3 sec/100 ml to 15 sec/100 ml.

When the air permeability and adhesive force conditions described above are satisfied, it may preferably make cleaning and process handling easy, and it may also make wetting of the separator by the electrolyte easier, so that an electrode assembly having uniform performance may be manufactured. In addition, side-effects, such as lithium (Li) precipitation in the electrode assembly and non-charging of the electrode assembly, may be prevented.

A withstand voltage of the electrode assembly of the present invention may be in a range from 1.56 kV to 1.8 kV. The electrode assembly of the present invention is manufactured by the method of manufacturing the electrode assembly including the primary heat press operation and the secondary heat press operation, which may result in both excellent adhesive force and excellent withstand voltage compared to the case where only the primary heat press operation is performed.

According to the exemplary embodiment of the present invention, when it is assumed that a thickness of the uppermost electrode is 100%, it is possible to provide an electrode assembly in which the thicknesses of all electrodes are 70% to 120% of the thickness of the uppermost electrode.

According to the exemplary embodiment of the present invention, the minimum thickness of the electrode of the electrode assembly may be 8.2 mm or more.

According to the exemplary embodiment of the present invention, a thickness deviation of the electrodes of the electrode assembly may be in a range from 0.013 mm to 0.035 mm.

When the thicknesses of the electrodes comprising the electrode assembly are small and the thickness deviations between the electrodes are small, the electrode assembly may tend to be more structurally stable and more stable in use. As a result of the present invention, it is beneficially possible to manufacture an electrode assembly in which the thicknesses of the electrodes comprising the electrode assembly are small and the thickness deviations between the electrodes are small.

Although the present invention has been described in detail through specific exemplary embodiments, the present invention is not limited thereto. Various different implementations may be made by those of ordinary skill in the art within the technical spirit of the present invention.

1) Example 1

19 positive electrode sheets, 20 negative electrode sheets, and an elongated separator were supplied to the stack table from the respective positive electrode supply unit, negative electrode supply unit, and separator supply unit.

More specifically, the positive electrode and the negative electrode were supplied after being cut from a positive electrode sheet and a negative electrode sheet, respectively, and the separator was supplied in the form of an elongated separator sheet. Thereafter, the supplied separator was folded while rotating the stack table and stacking the positive electrodes and the negative electrode as described above. A holding mechanism was used to press down on and stabilize the stack, which resulted in a stack including 39 electrodes.

After assembling the stack, a primary heat press operation was performed by gripping the stack with the gripper and pressing for 15 seconds while heating the stack under a temperature condition of 70° C. and a pressure condition of 1.91 MPa.

After the primary heat press operation, the gripper was released from the stack and the secondary heat press operation was performed, in which a pressing block was heated to a temperature of 70° C. (temperature condition), and a pressure of 2.71 Mpa (pressure condition) was applied to the stack with the heated pressing block for 10 seconds (press time), thus resulting in the electrode assembly of Example 1.

In the process of manufacturing the electrode assembly, the above-described disclosure of the present invention may be applied.

2) Examples 2 and 3

Electrode assemblies of Examples 2 and 3 were manufactured in the same manner as in Example 1, except that the method was performed under the temperature conditions, pressure conditions, and press time represented in Table 1 below.

TABLE 1

| | Primary heat press | | | |
|---|---|---|---|---|
| | Temperature condition | Pressure condition Press area (314.57 cm$^2$) | | Press time |
| | (° C.) | Tonf | MPa | (s) |
| Example 1 | 70 | 6 | 1.91 | 15 |
| Example 2 | | | | |
| Example 3 | | | | |

| | Secondary heat press | | | |
|---|---|---|---|---|
| | Temperature condition | Pressure condition Press area (554.1 cm$^2$) | | Press time |
| | (° C.) | Tonf | MPa | (s) |
| Example 1 | 70 | 5 | 2.71 | 10 |
| Example 2 | 60 | 4 | 2.17 | 20 |
| Example 3 | 80 | 4 | 2.17 | 20 |

3) Comparative Examples 1 to 7

Electrode assemblies of Comparative Examples 1 to 7 were manufactured in the same manner as in Example 1, except that the primary heat press operation was performed under the temperature conditions, pressure conditions, and press time represented in Table 2 below, and the secondary heat press operation was not performed.

TABLE 2

| | Primary heat press | | | |
|---|---|---|---|---|
| | Temperature condition | Pressure condition Press area | | Press time |
| | (° C.) | Tonf | MPa | (s) |
| Comparative Example 1 | 70 | 6 | 1.91 | 15 |
| Comparative Example 2 | 80 | 6 | 1.91 | 15 |
| Comparative Example 3 | 80 | 8 | 2.54 | 8 |
| Comparative Example 4 | 80 | 8 | 2.54 | 15 |
| Comparative Example 5 | 90 | 6 | 1.91 | 15 |
| Comparative Example 6 | 90 | 8 | 2.54 | 8 |
| Comparative Example 7 | 90 | 8 | 2.54 | 5 |

| | Secondary heat press (not performed) | | | |
|---|---|---|---|---|
| | Temperature condition | Pressure condition Press area (554.1 cm$^2$) | | Press time |
| | (° C.) | Tonf | MPa | (s) |
| Comparative Example 1 | — | — | — | — |
| Comparative Example 2 | — | — | — | — |
| Comparative Example 3 | — | — | — | — |
| Comparative Example 4 | — | — | — | — |
| Comparative Example 5 | — | — | — | — |
| Comparative Example 6 | — | — | — | — |
| Comparative Example 7 | — | — | — | — |

4) Experimental Example 1—Thickness Measurement

The maximum thicknesses, minimum thicknesses, and average thicknesses of the electrodes configuring the electrode assemblies of Examples 1 to 3 and Comparative Example 1, as well as the thickness deviations of the electrodes, were measured by using a plate thickness measurement device equipped with a load cell.

In particular, the thickness when the upper plate of the plate thickness measurement device is lowered and came into contact with the lower plate was set as 0 mm. Then, the electrode assembly of which the thickness was to be measured was placed inside the plate thickness measurement device, and the plate was further lowered by applying a pressing force of 90 kgf over the area of the electrodes for 3 seconds, after which the plate thickness was measured. In Example 1, the area to which the 90 kgf was applied was 554.1 cm².

The results are represented in Table 3.

TABLE 3

| | Thickness (mm) | | | |
|---|---|---|---|---|
| | Maximum (Max) | Minimum (Min) | Average (AVG) | Deviation |
| Example 1 | 8.266 | 8.237 | 8.256 | 0.029 |
| Example 2 | 8.265 | 8.251 | 8.258 | 0.014 |
| Example 3 | 8.237 | 8.205 | 8.216 | 0.032 |
| Comparative Example 1 | 8.357 | 8.349 | 8.352 | 0.008 |

From the results of Table 3, it could be confirmed that, in the electrode assembly according to the present invention, the thickness of the electrodes were small, and there was an appropriate amount of thickness deviation between the electrodes.

It is believed that this is because the electrode assembly of the present invention was manufactured by the manufacturing method including both the primary and secondary heat press operations.

5) Experimental Example 2—Evaluation of Air Permeability

The air permeability of the electrode assemblies of Examples 1 to 3 and Comparative Example 1 was evaluated.

Specifically, after collecting the separators in the electrode assemblies of Examples 1 to 3, and Comparative Example 1, the separators were cut to prepare separator samples having a size of 5 cm×5 cm (width×length). After that, the separator samples were washed with acetone.

Air permeability of Examples 1 to 3 and Comparative Example 1 were measured by measuring the time it took for 100 ml (or 100 cc) of air to pass through the separator of 1 square inch at room temperature and under the pressure condition of 0.05 MPa by using a Gurley type Densometer (No. 158) from Toyoseiki in accordance with the JIS Gurley measurement method of the Japanese industrial standard.

The results are represented in Table 4.

TABLE 4

| | Air permeability (sec/100 ml) | | | |
|---|---|---|---|---|
| | Upper surface | Middle | Lower surface | Deviation |
| Example 1 | 88 | 76 | 84 | 11.1 |
| Example 2 | 88 | 75 | 87 | 12.3 |
| Example 3 | 101 | 84 | 100 | 17.4 |
| Comparative Example 1 | 76 | 74 | 77 | 3.0 |

From the results of Table 4, it was confirmed that the upper surface air permeability and the lower surface air permeability of the electrode assembly according to the present invention were each independently 80 sec/100 ml or more. Further, it was confirmed that the upper surface air permeability and the lower surface air permeability of the electrode assembly according to the present invention did not exceed 120 sec/100 ml. That is, it could be confirmed that the electrode assembly according to the present invention has an appropriate level of air permeability for use as an electrode assembly.

In addition, it was confirmed that the air permeability deviation between each location was less than 20 sec/100 ml, which was considered to be substantially uniform.

On the other hand, in the case of Comparative Example 1, the deviation in air permeability between each location was smaller than that of the Example, but it could be confirmed that the upper surface air permeability and the lower surface air permeability were each independently less than 80 sec/100 ml, so that safety was lower than that of the electrode assembly according to the present invention. It is believed that this is because only the primary heat press was performed differently from the manufacturing process of the electrode assembly of the present invention.

6) Experimental Example 3—Adhesive Force Evaluation and Withstand Voltage Evaluation The electrode assemblies of Examples 1 to 3 and Comparative Examples 1 to 7 were disassembled and analyzed to measure upper surface, lower surface, and middle adhesive force. Specifically, adhesive force between the negative electrode and the separator located at the lowermost end of the stack was measured. Additionally, adhesive force between the negative electrode and the separator located at the uppermost end of the stack was measured. Finally, adhesive force between the negative electrode and the separator located at a middle location along the stacking direction of the stack was measured.

In each of the separated electrode assemblies, the negative electrode and the separator sampled had a width of 55 mm and a length of 20 mm. The sampled sample was adhered to the slide glass with the electrode being positioned on the adhesive surface of the slide glass. After that, the slide glass with the sample was mounted to the adhesive force measuring device and tested by performing a 90° peel test at a speed of 100 mm/min pursuant to the testing method set forth in ASTM-D6862. That is, an edge of the separator was pulled upwardly at 90° relative to the slide glass at a speed of 100 mm/min so as to peel the separator away from the electrode along the width direction of the sample (i.e., peeling from 0 mm to 55 mm). After discounting any initial significant fluctuations, the values for applied force per sample width (in grams/mm) were measured while the separator was peeled away from the electrode.

The results are represented in Table 5 below.

TABLE 5

| | Negative electrode adhesive force (gf/20 mm) | | | |
| --- | --- | --- | --- | --- |
| | Upper surface | Middle | Lower surface | Deviation |
| Example 1 | 19.8 | 10.8 | 21.5 | 10.7 |
| Example 2 | 11.1 | 7.1 | 14.3 | 7.2 |
| Example 3 | 25.3 | 12.0 | 22.4 | 13.3 |
| Comparative Example 1 | 9.8 | 5.8 | 11.2 | 5.5 |
| Comparative Example 2 | 15.6 | 6.9 | 15.8 | 8.9 |
| Comparative Example 3 | 14.5 | 5.6 | 16.5 | 10.9 |
| Comparative Example 4 | 19.5 | 9.0 | 21.2 | 12.2 |
| Comparative Example 5 | 19.5 | 13.8 | 24.2 | 10.4 |
| Comparative Example 6 | 15.6 | 7.2 | 25.9 | 18.7 |
| Comparative Example 7 | 30.7 | 12.6 | 25.1 | 18.1 |

In addition, the withstand voltages of the electrode assemblies of Examples 1 to 3 and Comparative Examples 1 to 7 were also measured.

The results are represented in Table 6 below.

TABLE 6

| | Withstand voltage (kV) |
| --- | --- |
| Example 1 | 1.58 |
| Example 2 | 1.56 |
| Example 3 | 1.58 |
| Comparative Example 1 | 1.82 |
| Comparative Example 2 | 1.51 |
| Comparative Example 3 | 1.49 |
| Comparative Example 4 | 1.47 |
| Comparative Example 5 | 1.48 |
| Comparative Example 6 | 1.45 |
| Comparative Example 7 | 1.45 |

Investigating the results of Table 5, it was confirmed that the adhesive force of Examples 1 to 3 was superior to that of Comparative Example 1, in which only the primary heat press operation was performed under conditions similar to those of the Examples.

In addition, investigating the results of Table 6, it was confirmed that the withstand voltage of Examples 1 to 3, in which the primary heat press operation was performed under higher temperature and higher pressure conditions than those of the Comparative Examples had a range of 1.56 kV or more and 1.8 kV or less.

That is, the electrode assembly of the present invention has excellent adhesive force and, at the same time, has a withstand voltage suitable for use as an electrode assembly. In that regard, a withstand voltage of 1.8 kV or less was confirmed.

It is believed that this is because the electrode assembly was manufactured by the manufacturing method including both the primary and secondary heat press operations.

7) Experimental Example 4

After charging the electrode assemblies of Example 1 and Comparative Example 1 was completed, the electrode assemblies were disassembled to check whether lithium (Li) was precipitated. The results are represented in FIGS. 5 and 6.

In the case of the electrode assembly of Comparative Example 1, it was confirmed that lithium (Li) was precipitated upon disassembly after the electrode assembly was completely charged as illustrated in FIG. 5.

In the case of the electrode assembly of Example 1, it was confirmed that lithium (Li) was not precipitated upon disassembly after the electrode assembly was completely charged, as illustrated in FIG. 6.

It is believed that this is because the electrode assembly was manufactured by the manufacturing method including both the primary and secondary heat press.

Through Experimental Examples 1 to 3, it could be confirmed that the electrode assembly according to the present invention has an appropriate withstand voltage while also having excellent stability and adhesive force, and is possible to prevent side-effects, such as lithium (Li) precipitation in the electrode assembly and non-charging of the electrode assembly.

What is claimed is:

1. An electrode assembly, comprising:
    a plurality of electrodes arranged in a stack along a stacking axis with a respective separator portion of a plurality of separator portions positioned between each of the electrodes in the stack, the plurality of electrodes including a top electrode of the plurality of electrodes positioned at a top of the stack along the stacking axis and including a bottom electrode of the plurality of electrodes positioned at a bottom of the stack along the stacking axis,
    wherein the bottom electrode has a thickness along the stacking axis that is from 80% to 120% of a thickness of the top electrode along the stacking axis,
    wherein a maximum thickness of each of the electrodes in the stack is less than 8.3 mm,
    wherein the plurality of separator portions include a top separator portion abutting the top electrode, and wherein the top separator portion has a value of air permeability from 80 sec/100 ml to 120 sec/100 ml per square inch of the top separator portion at a pressure of 0.05 MPa.

2. The electrode assembly of claim 1, wherein each of the plurality of separator portions is a portion of an elongated separator sheet, the elongated separator sheet being folded between each of the plurality of separator portions such that the elongated separator sheet follows a serpentine path traversing back and forth along an orthogonal dimension orthogonal to the stacking axis to extend between each successive one of the plurality of electrodes in the stack.

3. The electrode assembly of claim 1, wherein the thickness of each of the electrodes in the stack has a thickness along the stacking axis that is from 70% to 120% of a thickness of the top electrode along the stacking axis.

4. The electrode assembly of claim 3, wherein a minimum thickness of each of the electrodes of the electrode assembly is 8.2 mm.

5. The electrode assembly of claim 1, wherein the plurality of electrodes include an intermediate electrode of the plurality of electrodes between the top electrode and the bottom electrode along the stacking axis, wherein the plurality of separator portions include an intermediate separator portion abutting the intermediate electrode, and wherein the intermediate separator portion is adhered to the intermediate electrode to a degree that it would take a peel force in a range from 5 gf to 35 gf per 20 mm width of the intermediate separator portion applied to an edge of the intermediate separator portion in order to peel the intermediate separator portion away from the intermediate electrode at a speed of 100 mm/min along the stacking axis.

6. The electrode assembly of claim 1, wherein the top separator portion is adhered to the top electrode to a degree that it would take a peel force in a range from 5 gf to 70 gf per 20 mm width of the top separator portion applied to an edge of the top separator portion in order to peel the top separator portion away from the top electrode at a speed of 100 mm/min along the stacking axis.

7. The electrode assembly of claim 1, wherein the plurality of separator portions include a bottom separator portion abutting the bottom electrode, and wherein the bottom separator portion is adhered to the bottom electrode to a degree that it would take a peel force in a range from 5 gf to 75 gf per 20 mm width of the bottom separator portion applied to an edge of the bottom separator portion in order to peel the bottom separator portion away from the bottom electrode at a speed of 100 mm/min along the stacking axis.

8. The electrode assembly of claim 1, wherein the plurality of separator portions include a bottom separator portion abutting the bottom electrode, and wherein the bottom separator portion has a value of air permeability from 80 sec/100 ml to 120 sec/100 ml per square inch of the bottom separator portion at a pressure of 0.05 MPa.

9. The electrode assembly of claim 1, wherein the plurality of electrodes include an intermediate electrode of the plurality of electrodes positioned between the top electrode and the bottom electrode along the stacking axis, wherein the plurality of separator portions include: an intermediate separator portion abutting the intermediate electrode and a bottom separator portion abutting the bottom electrode,
wherein the intermediate separator portion is adhered to the intermediate electrode to a degree that it would take a first peel force per 20 mm width of the intermediate separator portion applied to an edge of the intermediate separator portion in order to peel the intermediate separator portion away from the intermediate electrode at a speed of 100 mm/min along the stacking axis, wherein the top and bottom separator portions are adhered to the respective top and bottom electrodes to a degree that it would take a second peel force per 20 mm width of the respective top and bottom separator portions applied to an edge of the respective top and bottom separator portion in order to peel the respective top and bottom separator portion away from the respective top and bottom electrode at a speed of 100 mm/min along the stacking axis, and wherein a difference between the first peel force and the second peel force is from 3 gf/20 mm to 15 gf/20 mm.

10. The electrode assembly of claim 1, wherein the plurality of electrodes include an intermediate electrode of the plurality of electrodes positioned between the top electrode and the bottom electrode along the stacking axis, wherein the separator portions include: an intermediate separator portion abutting the intermediate electrode and a bottom separator portion abutting the bottom electrode, wherein the intermediate separator portion has a second value of air permeability per square inch at a pressure of 0.05 MPa and at room temperature, and wherein the difference between the second value of air permeability and the value of air permeability of the top separator portion and the bottom separator portion is from 10 sec/100 ml to 35 sec/100 ml per square inch at a pressure of 0.05 MPa and at room temperature.

11. An electrode assembly, comprising:
a plurality of electrodes arranged in a stack along a stacking axis with a respective separator portion of a plurality of separator portions positioned between each of the electrodes in the stack, the plurality of electrodes including a top electrode of the plurality of electrodes positioned at a top of the stack along the stacking axis and including a bottom electrode of the plurality of electrodes positioned at a bottom of the stack along the stacking axis,
wherein the bottom electrode has a thickness along the stacking axis that is from 80% to 120% of a thickness of the top electrode along the stacking axis,
wherein a maximum thickness of each of the electrodes in the stack is less than 8.3 mm,
wherein the plurality of separator portions include a bottom separator portion abutting the bottom electrode, and wherein the bottom separator portion has a value of air permeability from 80 sec/100 ml to 120 sec/100 ml per square inch of the bottom separator portion at a pressure of 0.05 MPa.

12. The electrode assembly of claim 11, wherein each of the plurality of separator portions is a portion of an elongated separator sheet, the elongated separator sheet being folded between each of the plurality of separator portions such that the elongated separator sheet follows a serpentine path traversing back and forth along an orthogonal dimension orthogonal to the stacking axis to extend between each successive one of the plurality of electrodes in the stack.

13. The electrode assembly of claim 11, wherein the thickness of each of the electrodes in the stack has a thickness along the stacking axis that is from 70% to 120% of a thickness of the top electrode along the stacking axis.

14. The electrode assembly of claim 13, wherein a minimum thickness of each of the electrodes of the electrode assembly is 8.2 mm.

15. The electrode assembly of claim 11, wherein the plurality of electrodes include an intermediate electrode of the plurality of electrodes between the top electrode and the bottom electrode along the stacking axis, wherein the plurality of separator portions include an intermediate separator portion abutting the intermediate electrode, and wherein the intermediate separator portion is adhered to the intermediate electrode to a degree that it would take a peel force in a range from 5 gf to 35 gf per 20 mm width of the intermediate separator portion applied to an edge of the intermediate separator portion in order to peel the intermediate separator portion away from the intermediate electrode at a speed of 100 mm/min along the stacking axis.

16. The electrode assembly of claim 11, wherein the plurality of separator portions include a top separator portion abutting the top electrode, and wherein the top separator portion is adhered to the top electrode to a degree that it would take a peel force in a range from 5 gf to 70 gf per 20 mm width of the top separator portion applied to an edge of the top separator portion in order to peel the top separator portion away from the top electrode at a speed of 100 mm/min along the stacking axis.

17. The electrode assembly of claim 11, wherein the plurality of separator portions include a top separator portion abutting the top electrode, and wherein the top separator portion has a value of air permeability from 80 sec/100 ml to 120 sec/100 ml per square inch of the top separator portion at a pressure of 0.05 MPa.

18. The electrode assembly of claim 11, wherein the bottom separator portion is adhered to the bottom electrode to a degree that it would take a peel force in a range from 5 gf to 75 gf per 20 mm width of the bottom separator portion applied to an edge of the bottom separator portion in order to peel the bottom separator portion away from the bottom electrode at a speed of 100 mm/min along the stacking axis.

19. The electrode assembly of claim 11, wherein the plurality of electrodes include an intermediate electrode of the plurality of electrodes positioned between the top electrode and the bottom electrode along the stacking axis, wherein the plurality of separator portions include: an intermediate separator portion abutting the intermediate electrode and a top separator portion abutting the top electrode, wherein the intermediate separator portion is adhered to the intermediate electrode to a degree that it would take a first peel force per 20 mm width of the intermediate separator portion applied to an edge of the intermediate separator portion in order to peel the intermediate separator portion away from the intermediate electrode at a speed of 100 mm/min along the stacking axis, wherein the top and bottom separator portions are adhered to the respective top and bottom electrodes to a degree that it would take a second peel force per 20 mm width of the respective top and bottom separator portions applied to an edge of the respective top and bottom separator portion in order to peel the respective top and bottom separator portion away from the respective top and bottom electrode at a speed of 100 mm/min along the stacking axis, and wherein a difference between the first peel force and the second peel force is from 3 gf/20 mm to 15 gf/20 mm.

20. The electrode assembly of claim 11, wherein the plurality of electrodes include an intermediate electrode of the plurality of electrodes positioned between the top electrode and the bottom electrode along the stacking axis, wherein the separator portions include: an intermediate separator portion abutting the intermediate electrode and a bottom separator portion abutting the bottom electrode, wherein the intermediate separator portion has a second value of air permeability per square inch at a pressure of 0.05 MPa and at room temperature, and wherein the difference between the second value of air permeability and the value of air permeability of the top separator portion and the bottom separator portion is from 10 sec/100 ml to 35 sec/100 ml per square inch at a pressure of 0.05 MPa and at room temperature.

* * * * *